(12) United States Patent
Okude et al.

(10) Patent No.: US 7,463,973 B2
(45) Date of Patent: Dec. 9, 2008

(54) CAR NAVIGATION SYSTEM, TRAFFIC INFORMATION PROVIDING APPARATUS, CAR NAVIGATION DEVICE, AND TRAFFIC INFORMATION PROVIDING METHOD AND PROGRAM

(75) Inventors: Mariko Okude, Ibaraki (JP); Kenichiro Yamane, Ibaraki (JP)

(73) Assignee: Xanavi Informatics Corporation, Zama-shi (JP)

( * ) Notice: Subject to any disclaimer, the term of this patent is extended or adjusted under 35 U.S.C. 154(b) by 0 days.

(21) Appl. No.: 11/445,310

(22) Filed: Jun. 2, 2006

(65) Prior Publication Data
US 2006/0287818 A1 Dec. 21, 2006

(30) Foreign Application Priority Data
Jun. 2, 2005 (JP) ............................. 2005-162550

(51) Int. Cl.
*G01C 21/32* (2006.01)
(52) U.S. Cl. .................. 701/202; 701/209; 340/905
(58) Field of Classification Search ................ 701/202, 701/209, 3; 340/905, 601, 602
See application file for complete search history.

(56) References Cited

U.S. PATENT DOCUMENTS

| 6,317,686 | B1 | 11/2001 | Ran |
| 6,603,405 | B2 * | 8/2003 | Smith ............................ 340/905 |
| 6,845,324 | B2 * | 1/2005 | Smith ............................ 702/3 |
| 7,089,116 | B2 * | 8/2006 | Smith ............................ 702/3 |
| 7,161,504 | B2 * | 1/2007 | Linn ....................... 340/995.13 |
| 2002/0128766 | A1 | 9/2002 | Petzold et al. |
| 2002/0138196 | A1 | 9/2002 | Polidi et al. |
| 2004/0225437 | A1 | 11/2004 | Endo et al. |

FOREIGN PATENT DOCUMENTS

| DE | 100 44 935 A1 | 4/2002 |
| DE | 101 39 668 A1 | 2/2003 |
| DE | 10 2004 005 750 A1 | 9/2004 |
| JP | 2003-151079 A | 5/2003 |

OTHER PUBLICATIONS

German Examination Report dated Jun. 28, 2007 with an English translation of the pertinent portions (Nine (9) pages).

* cited by examiner

*Primary Examiner*—Mark Hellner
(74) *Attorney, Agent, or Firm*—Crowell & Moring LLP

(57) ABSTRACT

In the present invention a traffic information providing apparatus makes a vehicle location and a running date a starting point, and predicts arrival time to each link included in a designated area, based on current traffic information provided by a traffic information center; meteorological forecast information provided by a meteorological information center; and statistical traffic information acquired from a traffic information data base where past traffic information is stored, thereby produces meteorological consideration traffic prediction information of the link, and sends the produced meteorological consideration traffic prediction information to a car navigation device. Then the car navigation device is configured to receive the produced meteorological consideration traffic prediction information and to search a guidance route, based on the produced meteorological consideration traffic prediction information.

9 Claims, 15 Drawing Sheets

| Time | Travel Time (sec) | | | Jam Length (m) | | | ... |
|---|---|---|---|---|---|---|---|
| | Fine Weather | Rain | Snow | Fine Weather | Rain | Snow | ... |
| 7:00-7:05 | 123 | 200 | 200 | 0 | 10 | 30 | ... |
| 7:05-7:10 | 234 | 345 | 456 | 20 | 40 | 60 | ... |
| 7:10-7:15 | 345 | 567 | 789 | 40 | 80 | 100 | ... |
| ... | ... | ... | ... | ... | ... | ... | ... |

| Link Number | Link Length (m) | Predicted Travel Time (sec)   Fine Weather/Rain/Snow ||||
| | | 10:00 | 10:05 | 10:10 | 10:15 |
|---|---|---|---|---|---|
| 40 | 600 | 72/86/108 | 86/108/144 | 108/144/216 | 144/216/432 |
| 41 | 1000 | 144/180/240 | 180/240/360 | 144/180/240 | 120/144/180 |
| 42 | 800 | 82/96/115 | 96/115/144 | 144/192/288 | 72/82/96 |
| 43 | 1200 | 173/216/288 | 288/432/432 | 432/432/432 | 216/288/432 |

| Link Number | Link Length (m) | Predicted Travel Speed (km/h)   Fine Weather/Rain/Snow ||||
| | | 10:00 | 10:05 | 10:10 | 10:15 |
|---|---|---|---|---|---|
| 40 | 600 | 30/25/20 | 25/20/15 | 20/15/10 | 15/10/5 |
| 41 | 1000 | 25/20/15 | 20/15/10 | 25/20/15 | 30/25/20 |
| 42 | 800 | 35/30/25 | 30/25/20 | 20/15/10 | 40/35/30 |
| 43 | 1200 | 25/20/15 | 15/10/10 | 10/10/10 | 20/15/10 |

| Area | Date | Time | | | |
|---|---|---|---|---|---|
| | | 00:00–06:00 | 06:00–12:00 | 12:00–1800 | 18:00–24:00 |
| Area1 | 200X/1/30 | Cloudiness | Fine Weather | Rain | Cloudiness |
| | 200X/1/31 | Fine Weather | Fine Weather | Fine Weather | Fine Weather |
| | ... | ... | ... | ... | ... |
| Area2 | ... | ... | ... | ... | ... |

FIG. 9

| | | Predicted Time |
|---|---|---|
| Prediction of Area 1 | | Melerolgical Forecast Information |
| | Link 1 | Predicted Travel Time of Link 1 |
| | | Predicted Jam Length of Link 1 |
| | | Predicted Travel Speed of Link 1 |
| | Link2 | ... |
| | | ... |
| Prediction of Area 2 | ... | ... |
| ... | ... | ... |

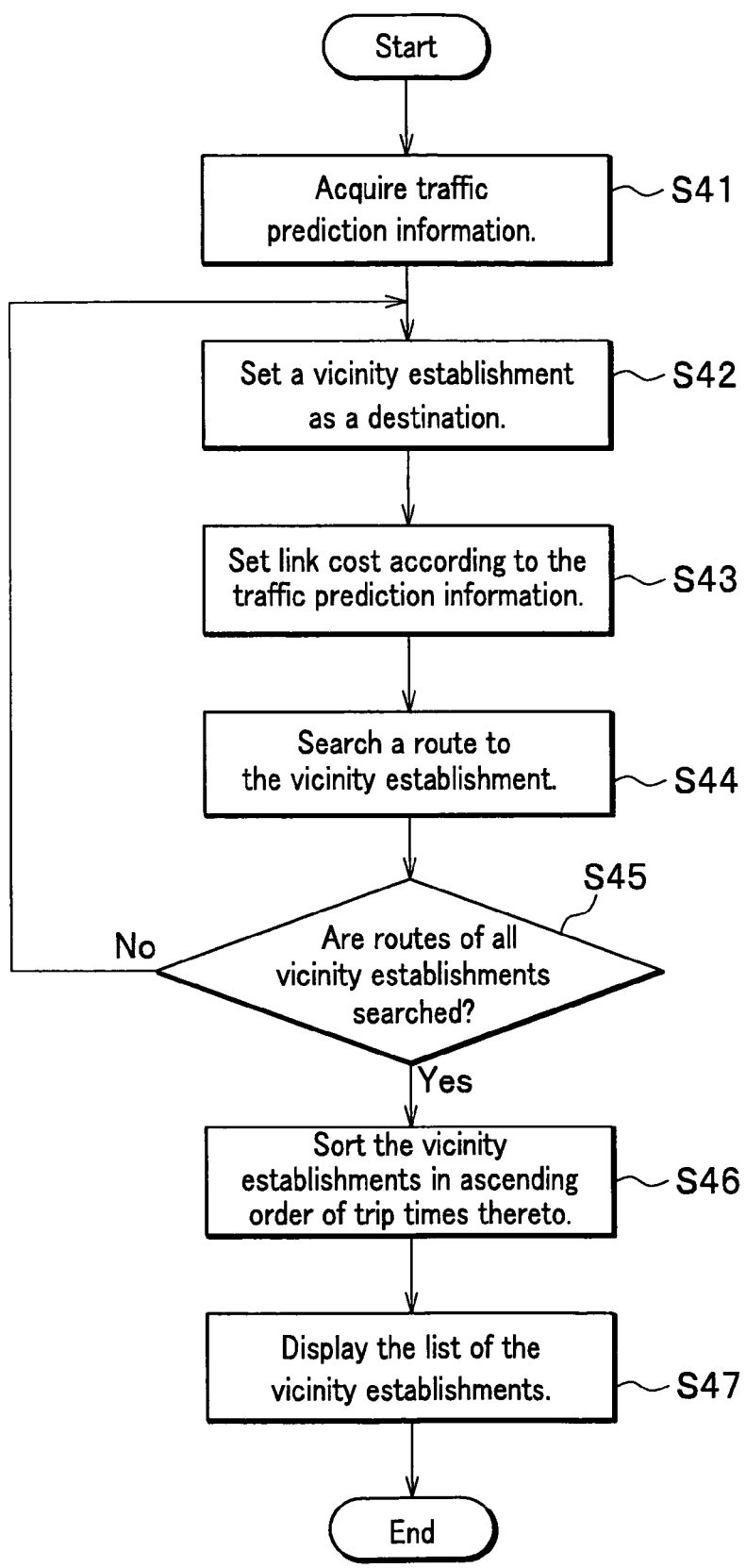

CAR NAVIGATION SYSTEM, TRAFFIC INFORMATION PROVIDING APPARATUS, CAR NAVIGATION DEVICE, AND TRAFFIC INFORMATION PROVIDING METHOD AND PROGRAM

BACKGROUND OF THE INVENTION

1. Field of the Invention

The present invention relates to a car navigation system, a traffic information providing apparatus, a car navigation device, and a traffic information providing method and program where predicted traffic information is applied, considering meteorological information.

2. Description of the Related Art

A car navigation device of recent years not only displays a shortest distance route to a destination and performs a route guidance according to the shortest distance, but also receives newest traffic information such as a traffic jam and a travel time provided by FM character multiplex broadcasting, for example, from VICS Center (Vehicle Information and Communication System Center), derives a shortest time route with considering the traffic information, and performs a route guidance according to the shortest time route.

However, because newest traffic information used at this time is present traffic information or traffic information a little earlier than present, a guidance route calculated by the car navigation device is not always a shortest time route. For example, in a case that a link A is not jammed at present where a vehicle is scheduled to pass after one hour, even if the link A is predicted to be jammed after the one hour, a guidance route passing such the link A is calculated if based on a calculation method of a current guidance route.

Consequently, for example, in Japanese Patent Laid-Open Publication No. 2003-151079 (paragraphs 0019 to 0052, FIGS. 1 to 4, and 6 to 9) is disclosed a method of predicting time when a vehicle passes and calculating a guidance route, based on traffic information such as a jam at the predicted time and a travel time. According to the method, in a case that the link A scheduled to be passed after one hour is predicted to be jammed after the one hour, it is enabled to calculate such a guidance route that avoids the link A. Meanwhile, the prediction of the traffic information is assumed to consider such a season, a day of the week, and a meteorological phenomenon.

In accordance with the calculation method of the guidance route disclosed in the Japanese Patent Laid-Open Publication No. 2003-151079, although a meteorological condition is assumed to be considered in predicting traffic information, the meteorological condition indicates weather at that time, a static meteorological condition such as a fine weather, rain, and snow. However, a meteorological phenomenon, weather ever changes similarly to a traffic condition of a road, and drastically changes at some time. Then being accompanied with the weather change, the traffic condition also largely changes. Accordingly, if traffic information is predicted with a static meteorological condition at that time, especially in a case that weather suddenly changes, a reliability of the predicted traffic information results in being lowered.

In view of the problems of the conventional technology thus described are strongly requested a car navigation system, a traffic information providing apparatus, a car navigation device, and a traffic information providing method and program configured to predict traffic information, considering meteorological information, and to calculate a guidance route, based on the predicted traffic information.

SUMMARY OF THE INVENTION

In the present invention a traffic information providing apparatus makes a vehicle location and a running date a starting point, and predicts arrival time to each link included in a designated area, based on current traffic information provided by a traffic information center; meteorological forecast information provided by a meteorological information center; and statistical traffic information acquired from a traffic information data base where past traffic information is stored, thereby produces meteorological consideration traffic prediction information of the link, and sends the produced meteorological consideration traffic prediction information to a car navigation device. Then the car navigation device is configured to receive the produced meteorological consideration traffic prediction information and to search a guidance route, based on the produced meteorological consideration traffic prediction information.

In other words, in a case of the meteorological consideration traffic prediction information thus produced, link cost (such a travel time of a link) after one hour predicted from a present traffic state, statistical traffic information of past traffic information, and weather forecast information is set, for example, as traffic information of a link where a vehicle is predicted to pass after the one hour and which is predicted to be jammed after the one hour, according to such a fine weather, rain, and snow at that time. Accordingly, using such the meteorological consideration traffic prediction information and searching a guidance route, it is enabled to search the guidance route where changes of traffic information and meteorological forecast information are considered. In other words, the link predicted to be jammed after one hour with considering the meteorological forecast information results in not being included in the guidance route.

BRIEF DESCRIPTION OF THE DRAWINGS

FIG. 9 is a drawing showing an example of a configuration of traffic prediction information provided to a car navigation device by a traffic information providing apparatus in the embodiment of the present invention.

FIG. 20 is a flowchart of processing of a vicinity establishment search, where a meteorological condition is considered and which is performed by a vicinity establishment search unit related to the embodiment of the present, invention.

BEST MODE FOR CARRYING OUT THE INVENTION

Here will be described an embodiment of the present invention in detail, referring to drawings.

<General Configuration>

Figure 1:
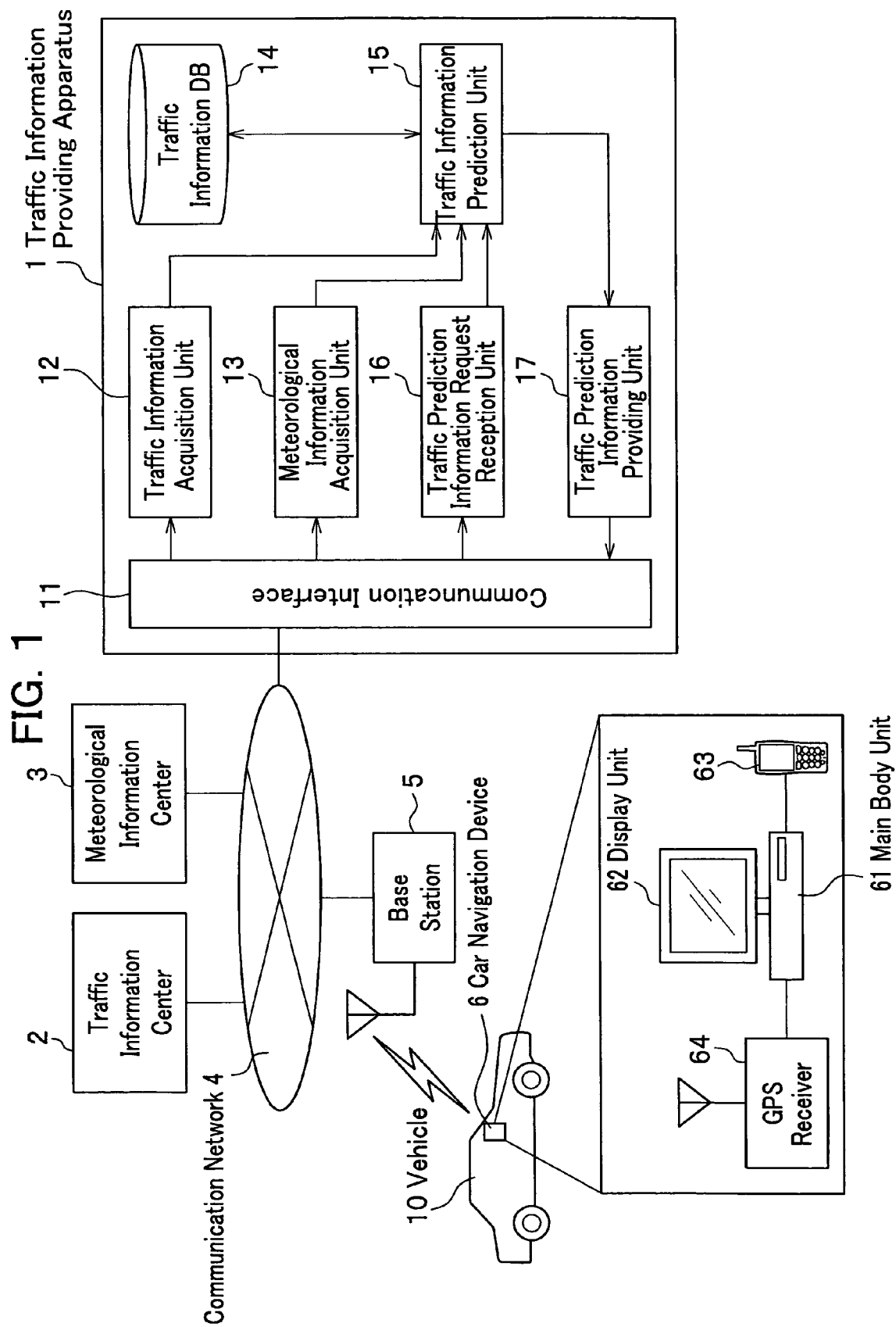
FIG. 1 is a drawing showing a general configuration of a car navigation system where a traffic information providing apparatus and a car navigation device related to an embodiment of the present invention are applied.

FIG. 1 is a drawing showing a general configuration of a car navigation system where a traffic information providing apparatus and a car navigation device (hereinafter referred to as "car-navi device") related to the embodiment of the present invention are applied. In FIG. 1 a traffic information providing apparatus 1 related to the embodiment is connected to a traffic information center 2 for distributing current traffic information and a meteorological information center 3 for distributing meteorological forecast information via a communication network 4 such as the Internet; and to a car-navi device 6 mounted on a vehicle 10 by a radio communication means via a base station 5 such as the communication network 4 and a mobile.

The traffic information providing apparatus 1 is configured with a so called computer (information processing unit) comprising a CPU (Central Processing Unit), a memory unit, and a hard disk unit not shown. Then the traffic information providing apparatus 1 comprises, as shown in FIG. 1, functional blocks such as a communication interface unit 11, a traffic information acquisition unit 12, a meteorological information acquisition unit 13, a traffic information DB (Data Base) 14, a traffic information prediction unit 15, a traffic prediction information request reception unit 16, and a traffic prediction information providing unit 17. Meanwhile, such the functional blocks are realized by the CPU running programs memorized in a semiconductor memory and a hard disk unit.

In FIG. 1 the traffic information acquisition unit 12 acquires current actual traffic information from the traffic information center 2 via the communication interface unit 11 and memorizes it in such a memory unit. In addition, the meteorological information acquisition unit 13 acquires meteorological forecast information from the meteorological information center 3 via the communication interface unit 11 and memorizes it in such a memory unit. In addition, the traffic information DB 14 is a data base where statistical traffic information is stored, wherein actual data of past traffic information is statistically processed.

Meanwhile, although the traffic information DB 14 is here configured to be included in the traffic information providing apparatus 1, it may also be included in the traffic information center 2, and in addition, included in an independent data base server connected to the device 1 via the communication network 4.

The traffic prediction information request reception unit 16 receives information (hereinafter referred to as "traffic prediction information request") for requesting traffic prediction information sent from the car-navi device 6, and activates the traffic information prediction unit 15. At this time the traffic prediction information request includes information such as a vehicle location of a prediction starting point, a running date and hour, and a designated area of a prediction object.

The traffic information prediction unit 15 is activated by the traffic prediction information request reception unit 16; predicts traffic information based on current traffic information and meteorological forecast information respectively acquired by the traffic information acquisition unit 12 and the meteorological information acquisition unit 13, and further based on statistical information of past traffic information read from the traffic information DB 14; and produces meteorological consideration traffic prediction information. Then the traffic prediction information providing unit 17 provides the meteorological consideration traffic prediction information produced by the traffic information prediction unit 15 to the car-navi device 6.

Meanwhile, all information included in the traffic information DB 14 is not necessarily needed to be the statistical information of past traffic information, its part or all may also be information acquired by such a test car; particularly, with respect to such a newly opened road, traffic information acquired by such a simulation is also available. In addition, in the traffic information DB 14 may also be included such information as a presence or absence of a traffic regulation, construction, an accident, a hazard; vacant/full information of a parking lot and an establishment; and a condition (open/close) of a toll booth and a service area.

In the car-navi device 6, as shown in FIG. 1, to a main body unit 61 are connected such a display unit 62, a mobile phone 63, and a GPS (Global Positioning System) receiver 64. Here, the main body unit 61 is configured with a small computer comprising such a memory unit and a hard disk unit. Meanwhile, instead of the hard disk unit or in addition to it, a DVD (Digital Versatile Disk) and a portable memory card may also be used. The main body unit 61 communicates with the base station 5 of the mobile phone 63 by it and is connected to the traffic information providing apparatus 1 via the communication network 4.

The car-navi device 6 sends a traffic prediction information request to the traffic information providing apparatus 1 and thereby can receive provision of meteorological consideration prediction traffic information from the device 1. Then the car-navi device 6 calculates a guidance route to a destination input by a driver of the vehicle 10, based on such the meteorological consideration prediction traffic information, and outputs guidance route instruction information according to the guidance route to the display unit 62. Meanwhile, the guidance route instruction information may also be output as a voice, using such a speaker.

<Function of Traffic Information Providing apparatus>

Next will be in detail described a traffic information prediction of a main function of the traffic information providing apparatus 1 and a configuration of information used relating to the prediction, using FIGS. 2 to 9.

Figures 2, 3:
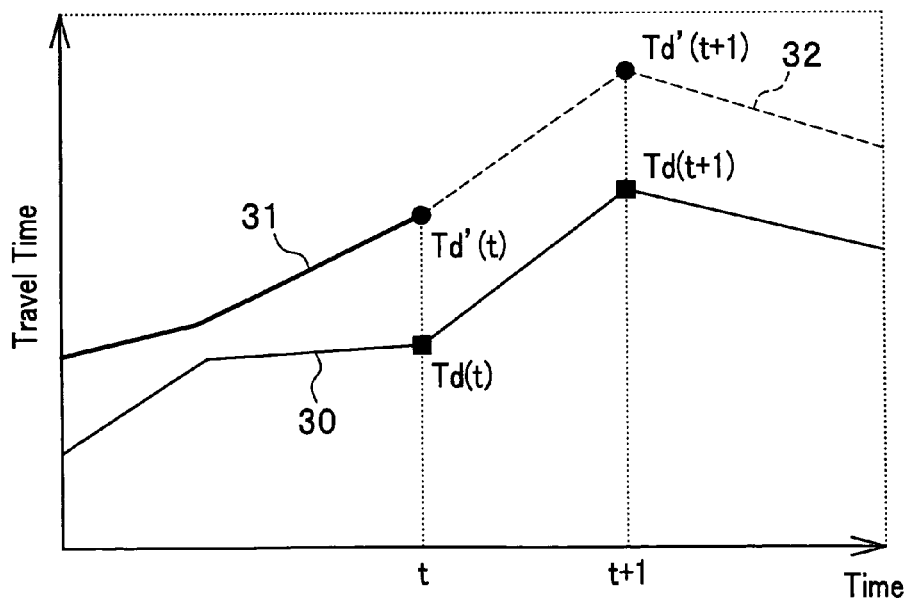
FIG. 2 is a drawing showing an example of statistical traffic information of a link stored in a traffic information DB related to the embodiment of the present invention.
FIG. 3 is a drawing illustrating a prediction method of a travel time, based on actual data of present traffic information and past statistical data, in the embodiment of the present invention.

The traffic information DB 14 stores statistical traffic information, where past actual data is statistically processed with respect to traffic information of each link, as base data for predicting traffic information. FIG. 2 is a drawing showing an example of statistical traffic information of a link stored in the traffic information DB 14. In other words, as shown in FIG. 2, in the traffic information DB 14, traffic information such as a travel time and jam length of the link divided, for example, into cases of a fine weather, rain, and snow is statistically processed for every five-minute interval and stored.

Meanwhile, although in the example of FIG. 2 a time interval for performing statistical processing assumed to be five minutes, it may not be five minutes and be changed as needed. In addition to the cases of a fine weather, rain, and snow, values such as a rainfall amount, a snowfall amount, a temperature, a wind speed may be combined as a statistical unit of weather. Furthermore, statistical data divided into a day kind such as a day of the week, Saturday, a holiday, a season, and an event day is also available. In addition, in collecting traffic information may also be used a travel time and speed information by which own vehicle ran, other than information supplied from the traffic information center 2.

FIG. 3 is a drawing illustrating a prediction method of a travel time, based on actual data of present traffic information and past statistical data. In FIG. 3 a polygonal line 30 represents statistical data of the travel time stored in the traffic information DB 14; a polygonal line 31, actual data of the travel time to a present time t of a prediction current day supplied from the traffic information center 2; and a polygonal line 32 (dotted line), prediction data of the travel time after the present time t. In other words, it is shown that the travel time is Td'(t) at the present time t and becomes Td'(t+1) at time (t+1) after an elapse of a unit time.

At this time, assuming that a ratio of the travel time Td'(t+1) to a travel time Td(t+1) of the statistical data at the time (t+1) is nearly equal to that of the travel time Td'(t) to a travel time Td(t) of the statistical data at the present time (t), the travel time Td'(t+1) at the time (t +1 ) can be predicted according to an equation (1):

$$Td'(t+1) = Td(t+1) \times \gamma \times Td'(t)/Td(t), \quad \text{Eq. (1)}$$

where $\gamma$ is a coefficient and normally assumed to be $\gamma = 1$.

However, in a case that the ratio Td'(t)/Td(t) of the current travel time Td'(t) to the travel time Td(t) of the statistical data at the present time (t) is extraordinary larger or smaller than a normal value, the $\gamma$ may also be made to be less than 1 or more than 1 as needed.

In addition, assuming that a difference (time variation amount) between the travel time Td'(t+1) and the travel time Td(t+1) of the statistical data at the time (t+1) is nearly equal to that of the travel time Td'(t) and the travel time Td(t) of the statistical data at the time (t), the travel time Td'(t+1) at the time (t+1) can be predicted according to an equation (2):

$$Td'(t+1) = Td(t+1) \times \delta \times (Td'(t) - Td(t)), \quad \text{Eq. (2)}$$

where $\delta$ is a coefficient and normally assumed to be $\delta = 1$.

However, in a case that the difference between the current travel time Td'(t) and the travel time Td(t) of the statistical data at the time (t+1) is extraordinary large, the $\delta$ may also be made to be less than 1 as needed.

Thus although in the example a method of predicting a travel time at the time (t+1) is described, if further predicting following travel times for every unit time based on the predicted travel time, it is enabled to predict travel times at time (t+2), (t+3), ... (t+n). Meanwhile, the unit time means a time interval when past actual data is statistically processed, and for example, in FIG. 2, is five minutes.

In addition, in the prediction of travel times by the equations (1) and (2) thus described, the values of Td(t), Td(t+1), ... Td(t+n) are derived, referring to the traffic information DB 14 shown in FIG. 2. At this time meteorological information used in referring to the traffic information DB 14 is each information at each time (t), (t+1), ... (t+n) in meteorological forecast information acquired from the meteorological information center 3. Accordingly, the values of the travel times Td(t), Td(t+1), ... Td(t+n) correspond to changes of meteorological forecast and become the values corresponding to the meteorological phenomena. Accordingly, in the embodiment it is enabled to predict traffic information, considering meteorological forecast information.

Figures 4, 5, 6:
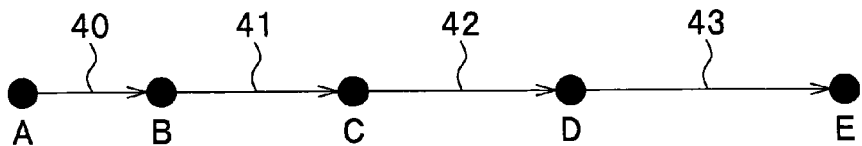
FIG. 4 is a drawing showing an example of a road network illustrating a usage method of a predicted travel time in the embodiment of the present invention.
FIG. 5 is a drawing showing an example of a predicted travel time at predicted time of links 40 to 43 in the embodiment of the present invention.
FIG. 6 is a drawing showing an example of a predicted travel speed at predicted time of links 40 to 43 in the embodiment of the present invention.

Next will be more concretely described a method of predicting traffic information, using FIGS. 4 to 8. Here, FIG. 4 is a drawing showing an example of a road network illustrating a usage method of a predicted travel time. In FIG. 4 symbols A to E represent intersections; symbols 40 to 43 represent road links. In addition, FIG. 5 is a drawing showing an example of a predicted travel time at each predicted time of the links 40 to 43. FIG. 6 is a drawing showing an example of a predicted travel speed at each predicted time of the links 40 to 43. In FIGS. 5 and 6, a predicted travel time where a meteorological condition is considered is made for every fine weather, rain, and snow at each predicted time. Meanwhile, the predicted travel speed of FIG. 6 can be derived from the predicted travel time and a link length.

Figures 7, 8:
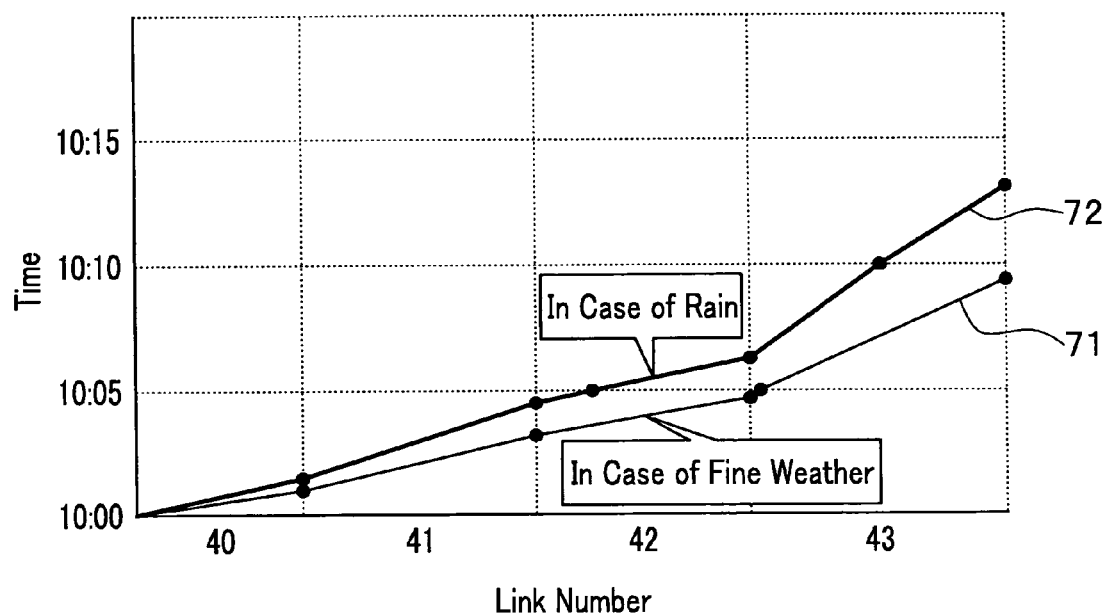
FIG. 7 is a drawing showing an example of calculating a predicted travel time in traveling intersections A to E, using the predicted travel time and the predicted travel speed shown in FIGS. 5 and 6, in the embodiment of the present invention.
FIG. 8 is a drawing showing an example of a configuration of meteorological forecast information acquired from a meteorological forecast center in the embodiment of the present invention.

FIG. 7 is a drawing showing an example of calculating a predicted travel time in traveling intersections A to E, using the predicted travel time and the predicted travel speed shown in FIGS. 5 and 6. Assume that a prediction current day is a fine day: in a case of departing the intersection A at time 10:00:00, it is predicted that it takes 72 seconds (average speed, 30 km/h) to pass the link 40; because arrival time 10:01:12 does not reach 10:05, use 25 km/h as a travel speed at the next link 41; therefore, a predicted travel time required for passing the link 41 is 144 seconds, and a sum-up travel time from the intersection A becomes 216 seconds.

Similarly, because a travel time required for passing the link 43 is 173 seconds (sum-up 471 seconds), it is requested to change to a speed of 10:05 on the way. In other words, because the speed (25 km/h) of 10:00 is used for first two seconds after proceeding into the link 43, a running distance during that time is about 14 m; with respect to remaining distance 1186 m, because the speed (15 km/h) of 10:05 is used, it is predicted that it takes about 285 seconds. After all, it is predicted that a travel time required for passing the link 43 is 287 seconds (sum-up 585 seconds).

Accordingly, predicted time of a vehicle arriving at the intersection E after departing the intersection A at 10:00:00 is 10:09:45. Its running state can be expressed as a graph of a polygonal line 71 in FIG. 7. Similarly, a running state in a case of a predicted current day being rainy can be expressed as a graph of a polygonal line 72 in FIG. 7, a predicted trip time to the intersection E is 806 seconds, and predicted time is 10:13:26.

FIG. 8 is a drawing showing an example of a configuration of meteorological forecast information acquired from a meteorological forecast center. As shown in FIG. 8, the meteorological forecast information is designed to be a format where weather information is memorized for every area and every predicted date and hour like "weather of an area 1; cloudy from 00:00 to 6:00, and fine from 6:00 to 12:00, Jan. 30, 200X."

Here, the "area" is a region of a unit where meteorological forecast information is provided, and means a region divided by a governmental block such as prefectures, a city, a ward, a town, and a village, or a region of a mesh unit divided by a longitude and a latitude. However, for a purpose of providing traffic information to the car-navi device 6, it is more convenient to handle the area as a mesh unit; therefore in a case of meteorological information being provided according to every governmental block is performed conversion processing of the meteorological information of the governmental block to that of the mesh unit. As a simple conversion method, it is enabled to make meteorological information of a mesh corresponding to that of a governmental block from a location relationship between the governmental block and the mesh area. Or else, from a location relationship between a place of a meteorological observatory and a mesh area, meteorological information of a region where the observatory is located may also be made that of the mesh where the observatory is located.

Meanwhile, in the example of FIG. 8, although meteorological information is provided at every time zone where a day is divided with six hours, the interval of the time zone may be changed as needed. In addition, by using a shorter time meteorological forecast (time sequential forecast) with respect to a vicinity of own vehicle, and a shorter period meteorological forecast (the day after tomorrow forecast) with respect to an area distant from own vehicle not less than a predetermined distance, it is enabled to heighten a hitting ratio of traffic prediction information of a running scheduled place (vicinity of own vehicle) in the near future. Furthermore, a present meteorological phenomenon may also be used in the vicinity of own vehicle; a meteorological forecast may also be used in an area distant from own vehicle not less than a predetermined distance. Thus by changing an update frequency of traffic prediction information according to a distance from own vehicle, it is also enabled to increase the update frequency of the vicinity of the own vehicle and to heighten a hitting ratio of a prediction. In addition, the forecast information may also include not only the information of a fine weather, rain, and snow but also that including a rainfall amount and a temperature.

In addition, as a method of predicting traffic information, although there are various methods such as a method of taking traffic flow on a road as is a fluid and estimating a jam interval, other than the method of using statistical information thus described, it is enabled to predict the traffic information according to meteorological information in any method similarly to the description of the embodiment by providing an estimation parameter according the meteorological information.

FIG. 9 is a drawing showing an example of a configuration of traffic prediction information provided to a car navigation device by a traffic information providing apparatus. The traffic prediction information comprises predicted time for every area and forecasted meteorological information (weather and the like) at the predicted time of the area, and further comprises information such as a predicted travel time, a jam length, and a travel speed with respect to each link included in the area. Furthermore, as detailed traffic information, such a jam occurrence place within the link may also be included.

<Function of Car-Navi Device>

Figure 10:
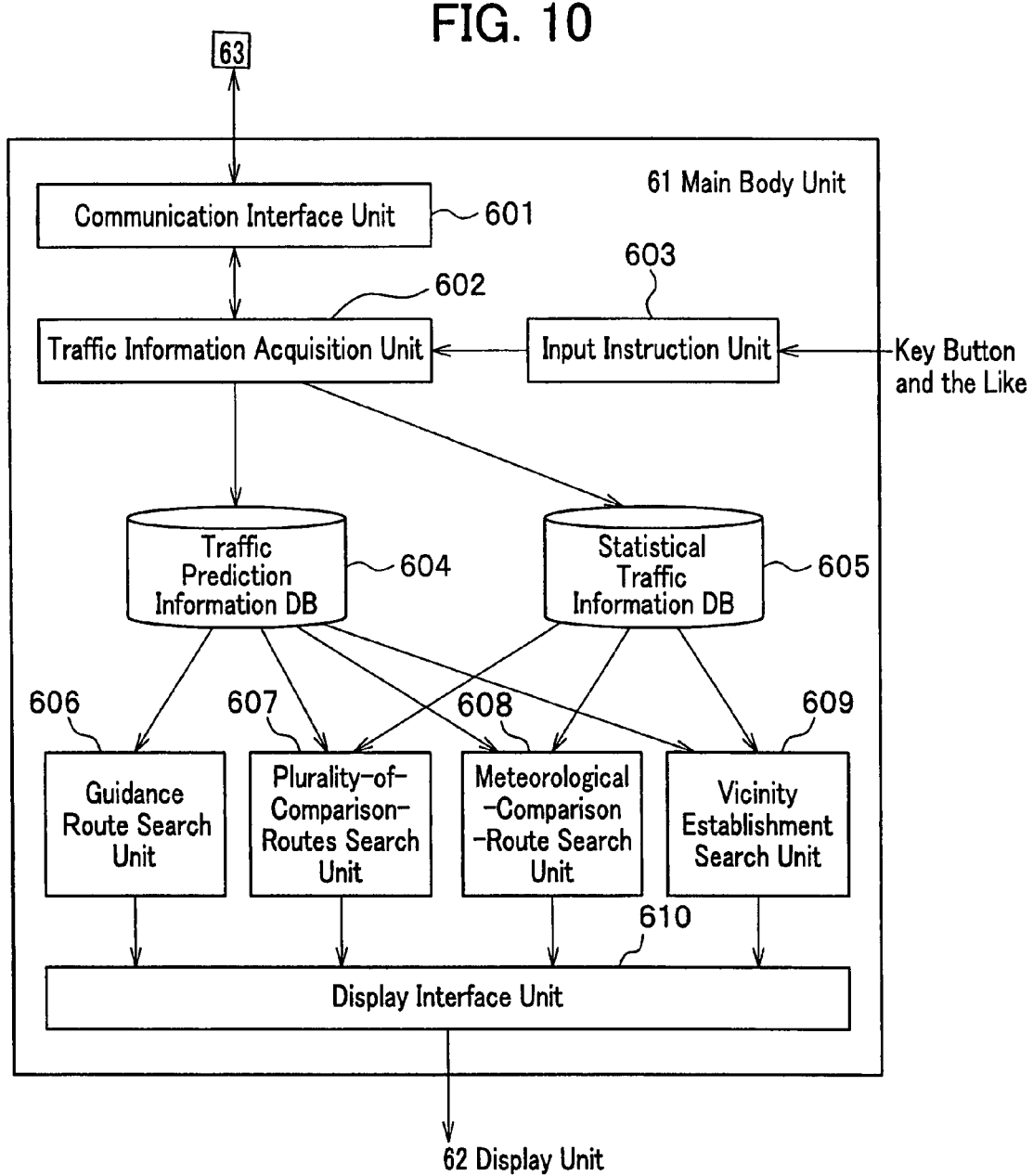
FIG. 10 is a drawing showing a functional block diagram of a car navigation device (main body unit) related to the embodiment of the present invention.

FIG. 10 is a drawing showing a functional block diagram of a car-navi device (main body unit). As shown in FIG. 10, the main body unit 61 of the car-navi device 6 comprises functional blocks such as a communication interface unit 601, a traffic prediction information acquisition unit 602, an input instruction unit 603, a traffic prediction information DB 604, a statistical traffic information DB 605, a guidance route search unit 606, a plurality-of-comparison-routes search unit 607, a meteorological-comparison-route search unit 608, a vicinity establishment search unit 609, and a display interface unit 610.

In FIG. 10, based on information from the input instruction unit 603 for receiving an input by a driver of the vehicle 10, the traffic prediction information acquisition unit 602 sends a traffic prediction information request to the traffic information providing apparatus 1 via such the communication interface unit 601 and the mobile 63, attaching information such as a destination, a predicted area, and a date and hour. Then receiving traffic prediction information sent from the traffic information providing apparatus 1, the traffic prediction information acquisition unit 602 stores the received traffic prediction information in the traffic prediction information DB 604. Meanwhile, a configuration of the received traffic prediction information at this time is as shown in FIG. 9.

The statistical traffic information DB 605 is a data base where traffic information made by statistically processing past traffic information is stored, and the information is memorized in advance in manufacturing or selling the car-navi device 6. In addition, when necessary, the statistical traffic information DB 605 can acquire necessary statistical traffic information from the traffic information providing apparatus 1 via the traffic prediction information acquisition unit 602, and store the statistical information. However, although because statistical traffic information is not information changing day by day, it is unnecessary to acquire the statistical information from the traffic information providing apparatus 1 in each case, the statistical information may also be periodically updated at such any change timing of a year, a month, and a season.

Meanwhile, there is some case that the statistical traffic information of a new area is requested, depending on a set destination, and then the traffic prediction information acquisition unit 602 sends information requested by the statistical information to the traffic information providing apparatus 1 with attaching information such as an area, and acquires the statistical information of a necessary area.

In FIG. 10 each functional block of the guidance route search unit 606, the plurality-of-comparison-routes search unit 607, the meteorological-comparison-route search unit 608, and the vicinity establishment search unit 609 is for realizing various route search functions of the car-navi device 6, and its detail will be described, using drawings after FIG. 11. Meanwhile, the functional block is realized by a not shown CPU included in the main body unit 61 for running a program stored in a semiconductor memory not shown.

<<Route Search and Display by Traffic Prediction Information Including Meteorological Forecast Information>>

Figure 11:
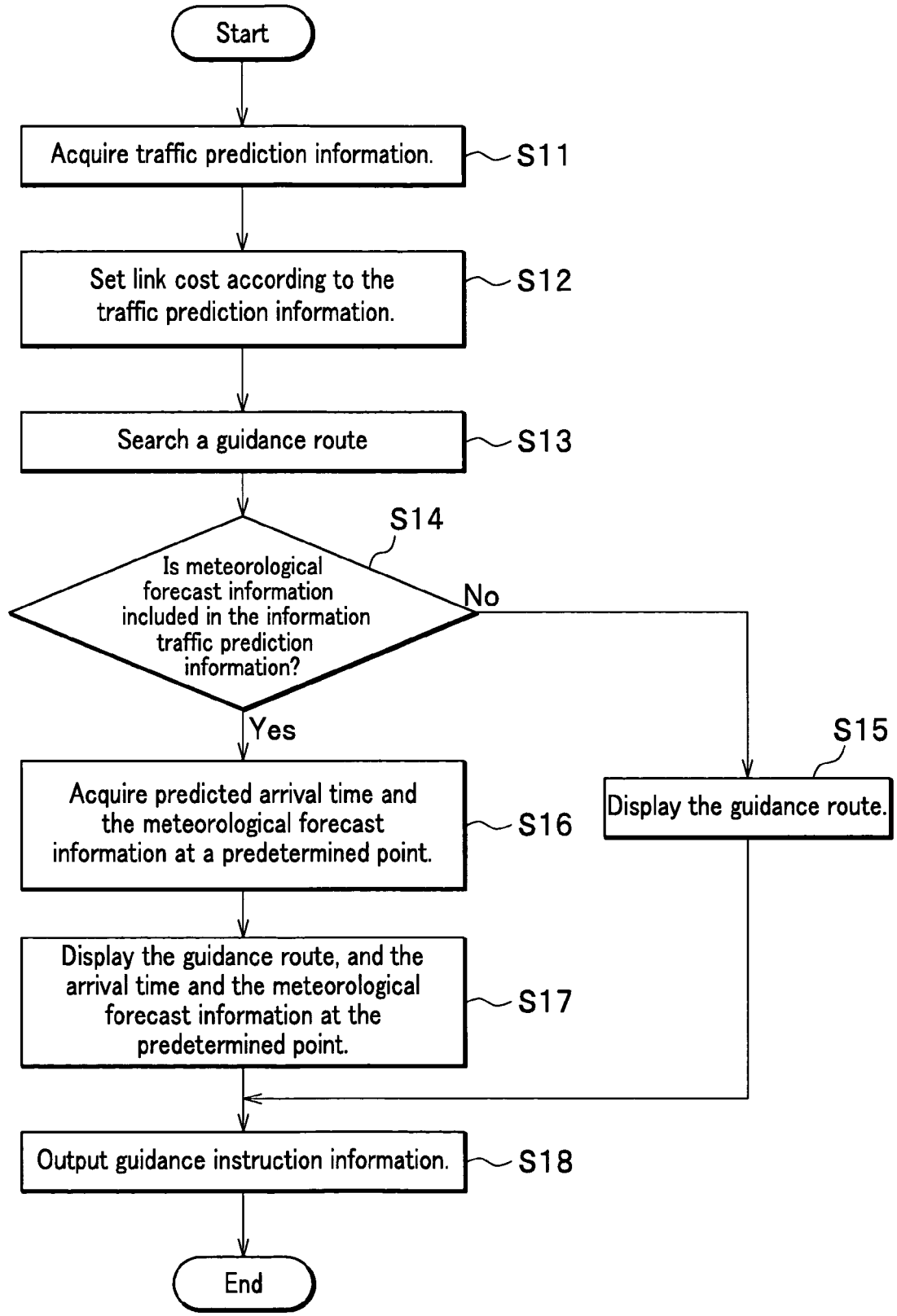
FIG. 11 is a flowchart of navigation processing of using traffic prediction information in a car navigation device related to the embodiment of the present invention.

FIG. 11 is a flowchart of navigation processing of using traffic prediction information in the car-navi device 6. In FIG. 11, if such a driver of the vehicle 10 sets such a condition of a destination and a route search by an input means such as a key button, the traffic prediction information acquisition unit 602 requests traffic prediction information for the traffic information providing apparatus 1, attaching information such as a predicted area, and a date and hour; acquires the traffic prediction information of the predicted area and the date and hour requested (step S11); and stores the acquired traffic prediction information in the traffic prediction information DB 604. Next, the guidance route search unit 606 sets link cost of a road (step S12), based on the traffic prediction information stored in the traffic prediction information DB 604, and searches a guidance route (a normal recommended route is a shortest time route) from a present location or a point set by the driver to a destination (step S13).

Figure 12:
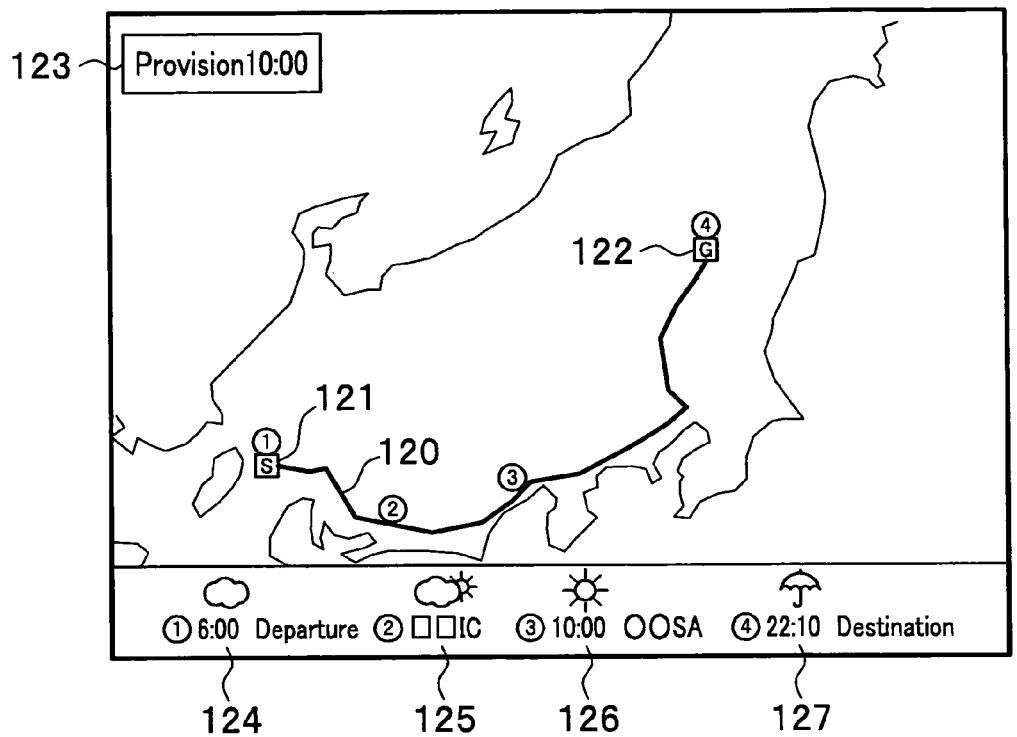
FIG. 12 is a drawing showing an example of a display screen where a guidance route search unit related to the embodiment of the present invention displays a guidance route, predicted arrival time of its via-points, and meteorological forecast information thereat.

Subsequently, the guidance route search unit 606 determines whether or not meteorological forecast information is included in the traffic prediction information used in the route search (step S14); if the meteorological forecast information is included (Yes in the step S14), the unit 606 calculates predicted arrival time at predetermined points (such a present point, a via-point, the destination, and a point designated by the driver in advance) on the searched guidance route, and acquires meteorological forecast information at the predicted arrival time (step S16). Then the guidance route search unit 606 displays the guidance route, for example, as shown in FIG. 12, in the display unit 62 via the display interface unit 610, and further displays the predicted arrival time at the predetermined points and the meteorological forecast information thereat (step S17). After then, if the vehicle 10 runs according to the searched guidance route, the guidance route search unit 606 outputs guidance instruction information every time when the vehicle 10 passes such an intersection (step S18).

In addition, if the meteorological forecast information is not included in the step S14 (No in the step S14), the guidance route search unit 606 merely displays the guidance route via the display interface unit 610 (step S15), and after then, outputs guidance instruction information according to the searched guidance route every time when the vehicle 10 passes such an intersection (step S18). In other words, in this case is not displayed the meteorological forecast information in such the via-point during the guidance route. Meanwhile, even if the meteorological forecast information is not displayed, if the traffic prediction information acquired in the step S11 is the information where the meteorological forecast information is considered, the guidance route displayed in the step S15 is adapted to be the traffic prediction information where the meteorological forecast information is considered.

FIG. 12 is a drawing showing an example of a display screen where a guidance route search unit displays a guidance route, predicted arrival time of its via-points, and meteorological forecast information thereat. A guidance route 120 is a recommended route from a departure point 121 to a destination 122 calculated on the basis of traffic prediction information. In addition, a symbol 124 is departure time, symbols 125 and 126 are scheduled pass time of the via-points, and a symbol 127 is predicted arrival time at a destination. If the guidance route 120 is traffic prediction information including meteorological forecast information, in addition to the predicted arrival time, the forecast information thereat is displayed in each display unit of the symbols 126 and 127. In addition, considering safety during driving, the scheduled pass time of each via-point and the meteorological forecast information thereat may also be output, using a voice output means together with the display or instead of it. Meanwhile, in FIG. 12 provision time information 123 indicates time when the traffic prediction information is provided.

Figure 13:
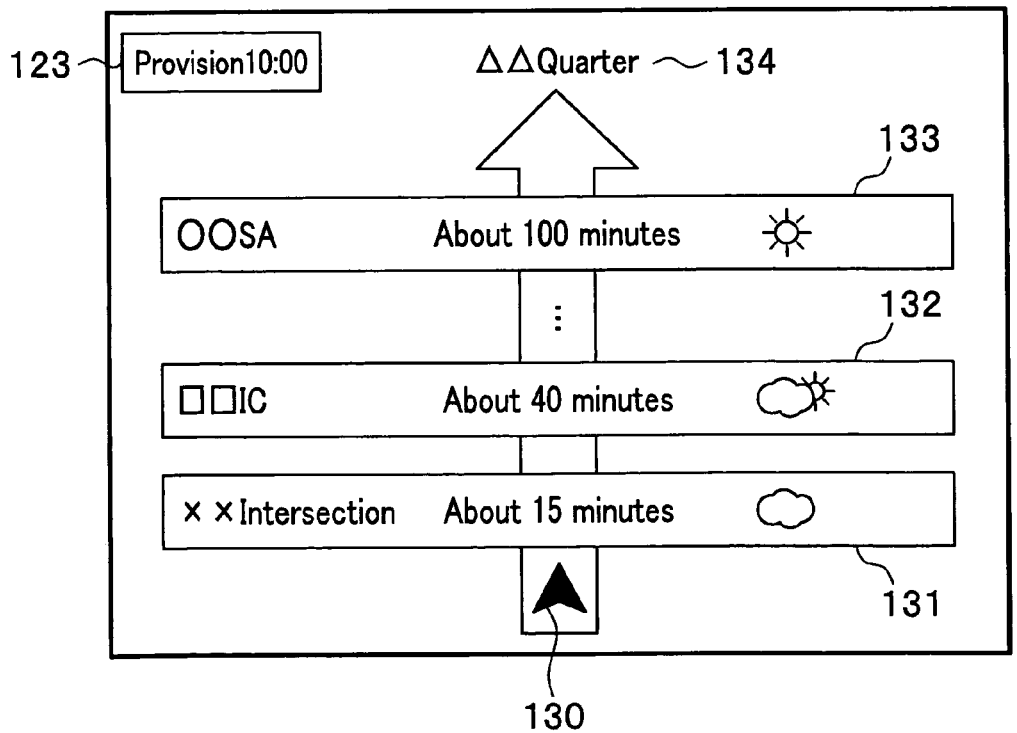
FIG. 13 is a drawing showing an example of a display screen where a guidance route search unit related to the embodiment of the present invention simply displays a guidance route, predicted arrival time of its via-points, and meteorological forecast information thereat.

FIG. 13 is a drawing showing an example of a display screen where a guidance route search unit simply displays a guidance route, predicted arrival time of its via-points, and meteorological forecast information thereat. In FIG. 13, with respect to main via-points 131 to 133 from own vehicle point 130 to a destination quarter 134, with icons are displayed names of the points, trip times calculated on the basis of traffic prediction information thereto, and the meteorological forecast information at the predicted arrival time.

<<Search of Plurality of Routes and Comparison Display thereof>>

The car-navi device 6 in the embodiment displays the guidance routes thus described, and comprises not only a function of outputting instruction information of a vehicle guidance but also that of calculating and displaying various pieces of route information. Here will be described various route searches and display functions thereof.

Figure 14:
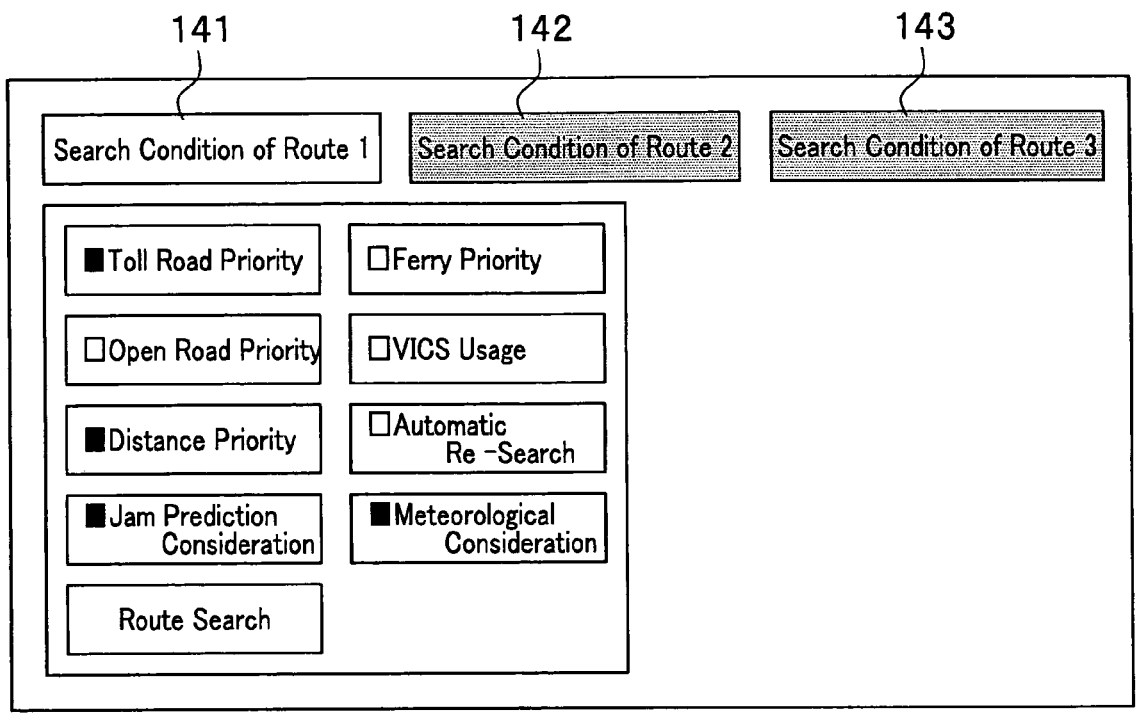
FIG. 14 is a drawing showing an example of a condition setting screen when a route search is performed with a plurality of conditions in a car navigation device related to the embodiment of the present invention.

FIG. 14 is a drawing showing an example of a condition setting screen when a route search is performed with a plurality of conditions in the car-navi device 6. In the example of the condition setting screen, by selecting buttons of route search conditions 141, 142, and 143, maximum three search conditions can be set. In addition, according to check boxes, the search conditions can be selected from such a toll road priority, an open road priority, a distance priority, a jam prediction consideration, a ferry priority, VICS usage, an automatic re-search, and a meteorological consideration. Here, the toll road priority, the distance priority, the jam prediction consideration, and the meteorological consideration are selected. Meanwhile, the check box of the meteorological consideration may also be made effective only when the jam prediction consideration is selected; or if the meteorological consideration is selected, the jam prediction consideration may also be assumed to be automatically selected.

Figure 15:
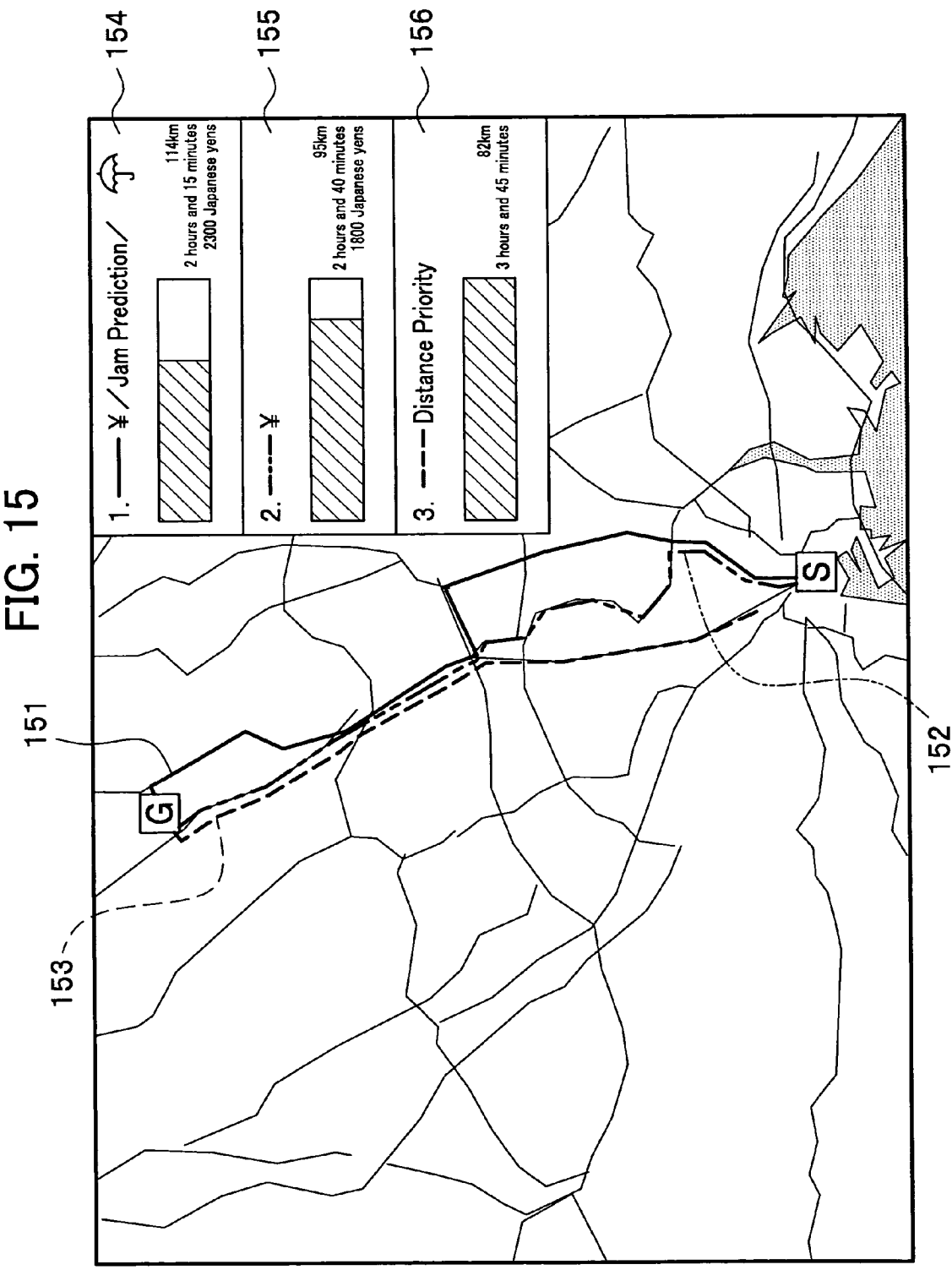
FIG. 15 is a drawing showing an example of a display screen when a route search is performed with a plurality of conditions in a car navigation device related to the embodiment of the present invention.

FIG. 15 is a drawing showing an example of a display screen when a route search is performed with a plurality of conditions in a car navigation device. In FIG. 15 routes 151 to 153 are recommended routes from a departure point S to a destination G calculated according to different search conditions. In addition, symbols 154 to 156 are comparison summary information of the routes, and as the information are respectively displayed such search conditions, distances, trip times, and fees. Meanwhile, in a case of FIG. 15 a first route (solid line route 151) is a route, where the toll road priority and the meteorological forecast information are considered, and indicates a result of predicting traffic prediction information in rain because the forecast information on a running day is rainy. In addition, a second route (chain line route 152) is a route of the toll road priority, and a third route (broken line route 153) is a route of the distance priority. Meanwhile, a running day may also be a running scheduled day separately designated with an input means by a driver.

Figure 16:
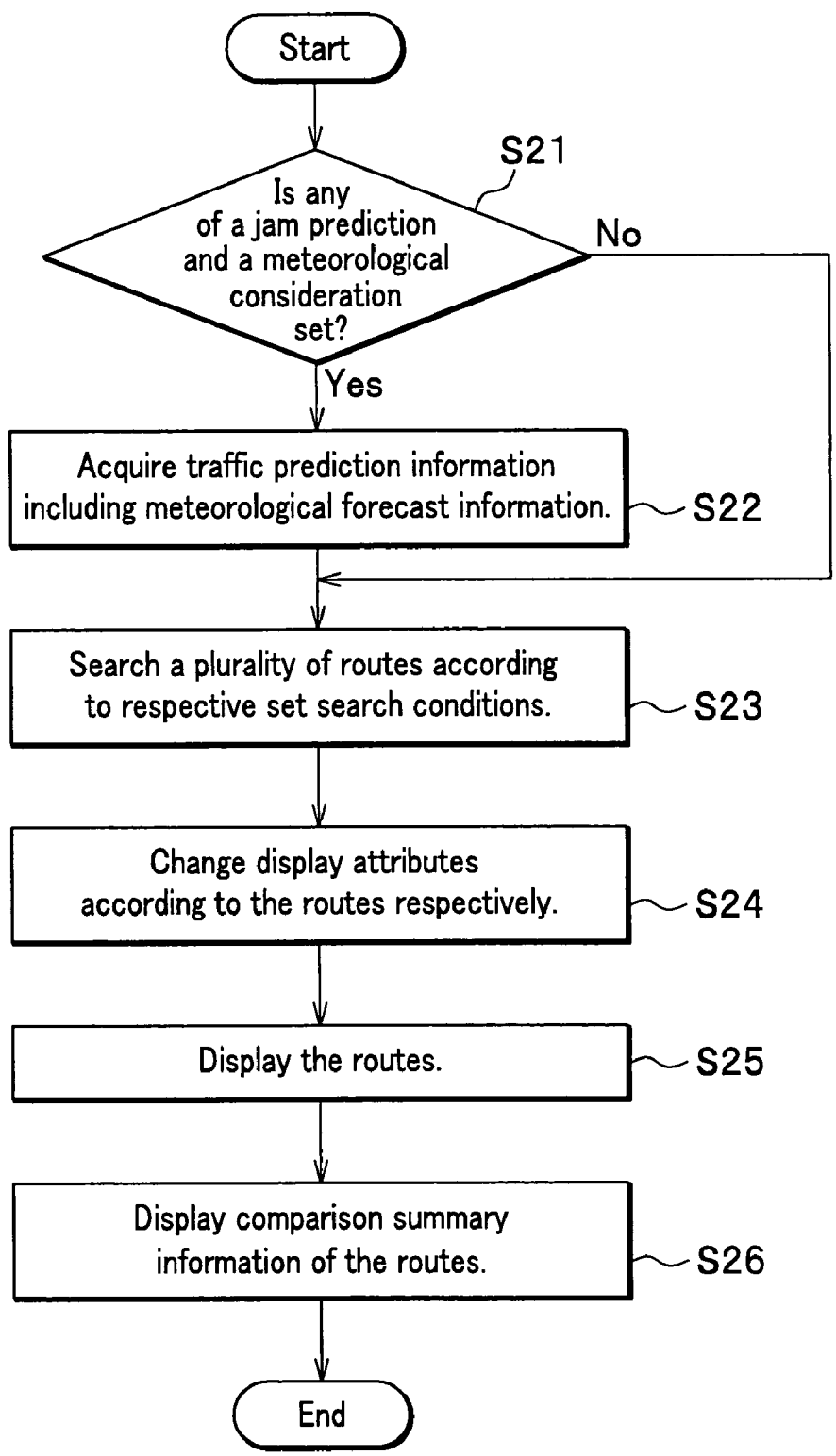
FIG. 16 is a flowchart of processing performed by a plurality-of-comparison-routes search unit in a car navigation device related to the embodiment of the present invention.

Thus the car-navi device 6 performs the function shown in FIG. 15 as processing of the plurality-of-comparison-routes search unit 607 (see FIG. 10). FIG. 16 is a flowchart of processing performed by a plurality-of-comparison-routes search unit.

In FIG. 16 the plurality-of-comparison-routes search unit 607 firstly determines by the screen shown in FIG. 14 whether or not any one of the jam prediction consideration and the meteorological consideration is set (step S21). Then if any one of the jam prediction consideration and the meteorological consideration is set (Yes in the step S21), the plurality-of-comparison-routes search unit 607 acquires traffic prediction information from the traffic information providing apparatus 1 via the traffic prediction information acquisition unit 602 (step S22), and stores the acquired traffic prediction information in the traffic prediction information DB 604. In addition, if any one of the jam prediction consideration and the meteorological consideration is not set (No in the step S21), the plurality-of-comparison-routes search unit 607 skips to perform the step S22 because it can use the statistical traffic information DB 605 in a guidance route search.

Next, with respect to a plurality of search conditions respectively set in the screen of FIG. 14, the plurality-of-comparison-routes search unit 607 searches a plurality of routes to the destination G (step S23). Then, while changing display attributes (a kind of line, a display color, an icon, and the like) for every route via the display interface unit 610 (step S24), the plurality-of-comparison-routes search unit 607 displays the plurality of the searched routes (step S25). Furthermore, with respect to the plurality of the routes, the plurality-of-comparison-routes search unit 607 displays the comparison summary information (the symbols 154 to 156 in FIG. 15) of the routes (step S26).

<<Route Search for Plurality of Meteorological Conditions and Comparison Display thereof>>

Figure 17:
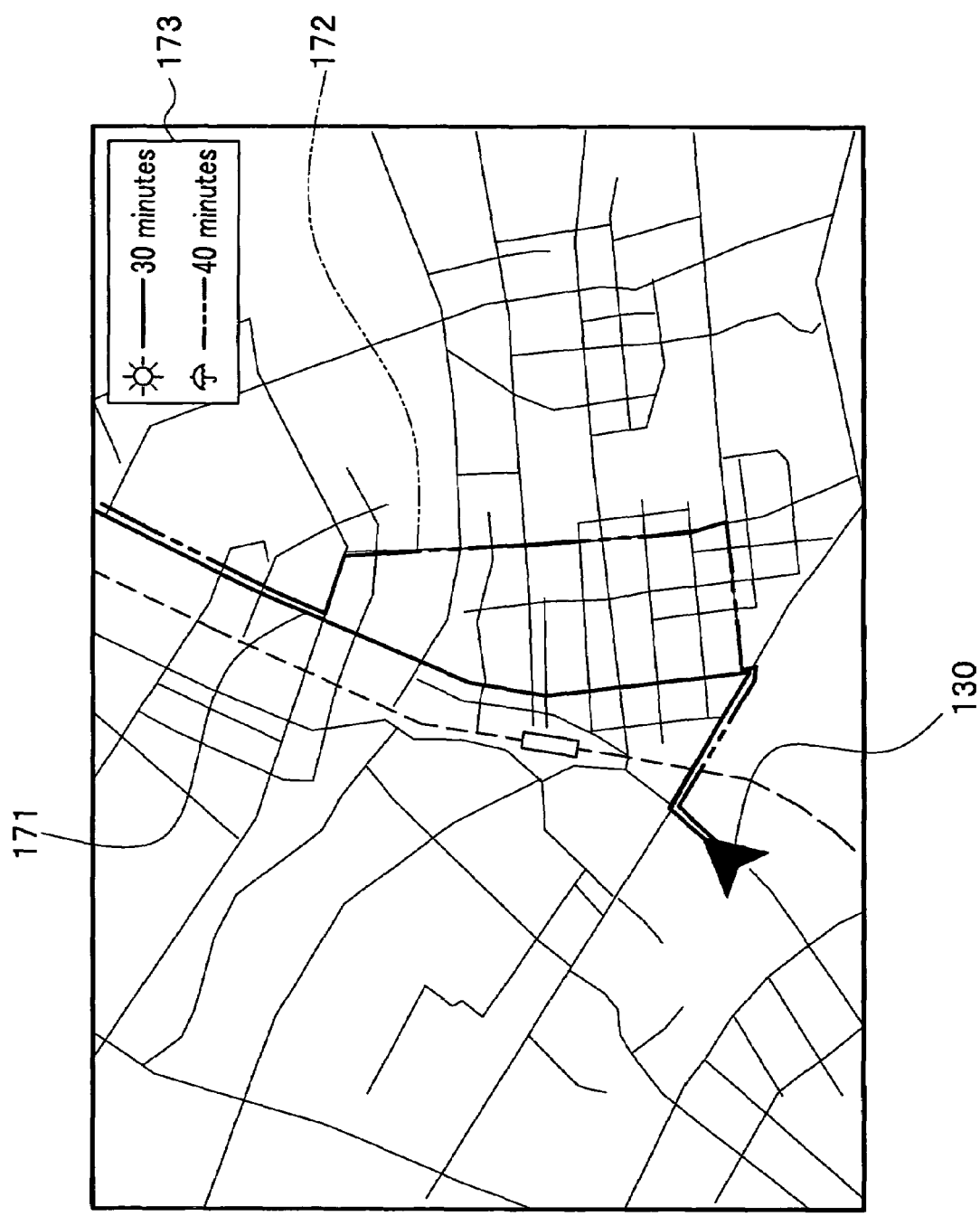
FIG. 17 is a drawing showing an example of a display screen when a route search is performed for a plurality of meteorological conditions in a car navigation device related to the embodiment of the present invention.

FIG. 17 is a drawing showing an example of a display screen when a route search is performed for a plurality of meteorological conditions. In FIG. 17 a route 171 (displayed in solid line) indicates a recommended route in a case of meteorological forecast information being assumed to be fine; a route 172 (displayed in chain double-dashed line) indicates a recommended route in a case of the meteorological forecast information being assumed to be rainy. By acquiring a plurality of pieces of traffic prediction information for every meteorological condition of meteorological forecast information, it is enabled to comparatively refer to a recommended route for the meteorological condition. Meanwhile, a symbol 173 is summary information of the routes, and here, meteorological conditions and trip times to a destination are displayed, respectively. In addition, as the summary information, additionally such predicted arrival time and a distance to the destination may also be displayed.

Figure 18:
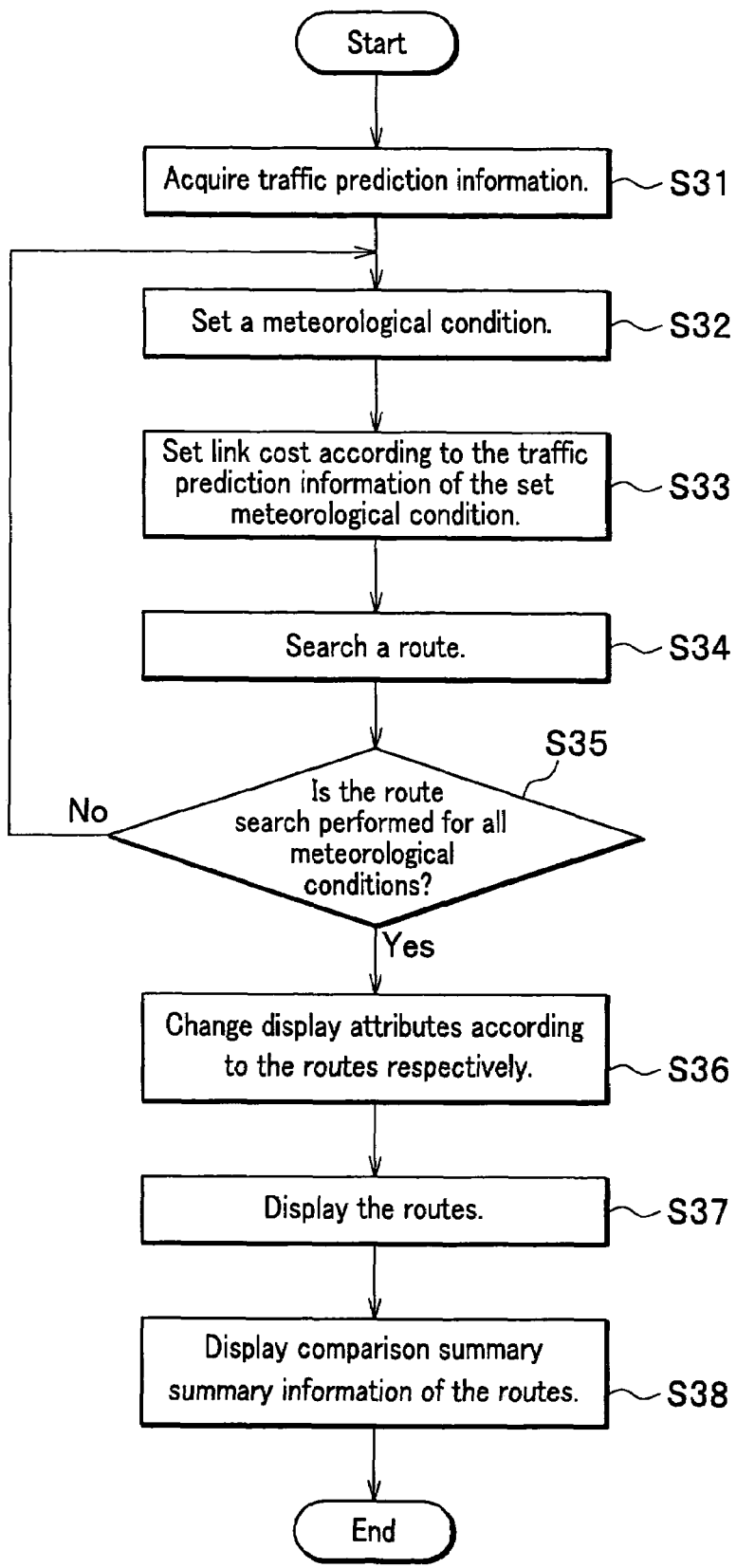
FIG. 18 is a flowchart of processing performed by a meteorological-comparison-route search unit in a car navigation device related to the embodiment of the present invention.

FIG. 18 is a flowchart of processing performed by a meteorological-comparison-route search unit, which displays the display screen of FIG. 17. In FIG. 17 the meteorological-comparison-route search unit 608 acquires traffic prediction information including a plurality of meteorological conditions from the traffic information providing apparatus 1 (step S31). Then the meteorological-comparison-route search unit 608 picks up one of the plurality of the meteorological conditions, and sets the meteorological condition of a route search (step S32). Then the meteorological-comparison-route search unit 608 sets link cost according to the traffic prediction information of the set meteorological condition, and searches the route (step S34).

Next, the meteorological-comparison-route search unit 608 determines whether or not the route search is performed with respect to all of the meteorological conditions (step S35), and if there exists any meteorological condition according to which the route search is not performed (No in the step S35), the unit 608 returns to the step S32 and repeats the processing after the step S32. In addition, if the route search is performed with respect to all of the meteorological conditions (Yes in the step S35), while changing display attributes (a kind of line, a display color, an icon, and the like) via the display interface unit 610 (step S36), the meteorological-comparison-route search unit 608 displays the plurality of the searched routes (step S37). Furthermore, with respect to the plurality of the searched routes, the meteorological-comparison-route search unit 608 displays the comparison summary information 173 thereof (see FIG. 17).

Meanwhile, in the processing thus shown in FIG. 18 the meteorological-comparison-route search unit 608 may not also acquire the traffic prediction information (no requirement of the step S31), and may search routes, using the statistical traffic information stored in the statistical traffic information DB 605. In this case, in the step S33 the meteorological-comparison-route search unit 608 sets link cost according to the statistical traffic information of the statistical traffic information DB 605 instead of the traffic prediction information.

<<Search of Vicinity Establishment with Considering Meteorological Condition>>

Figure 19:
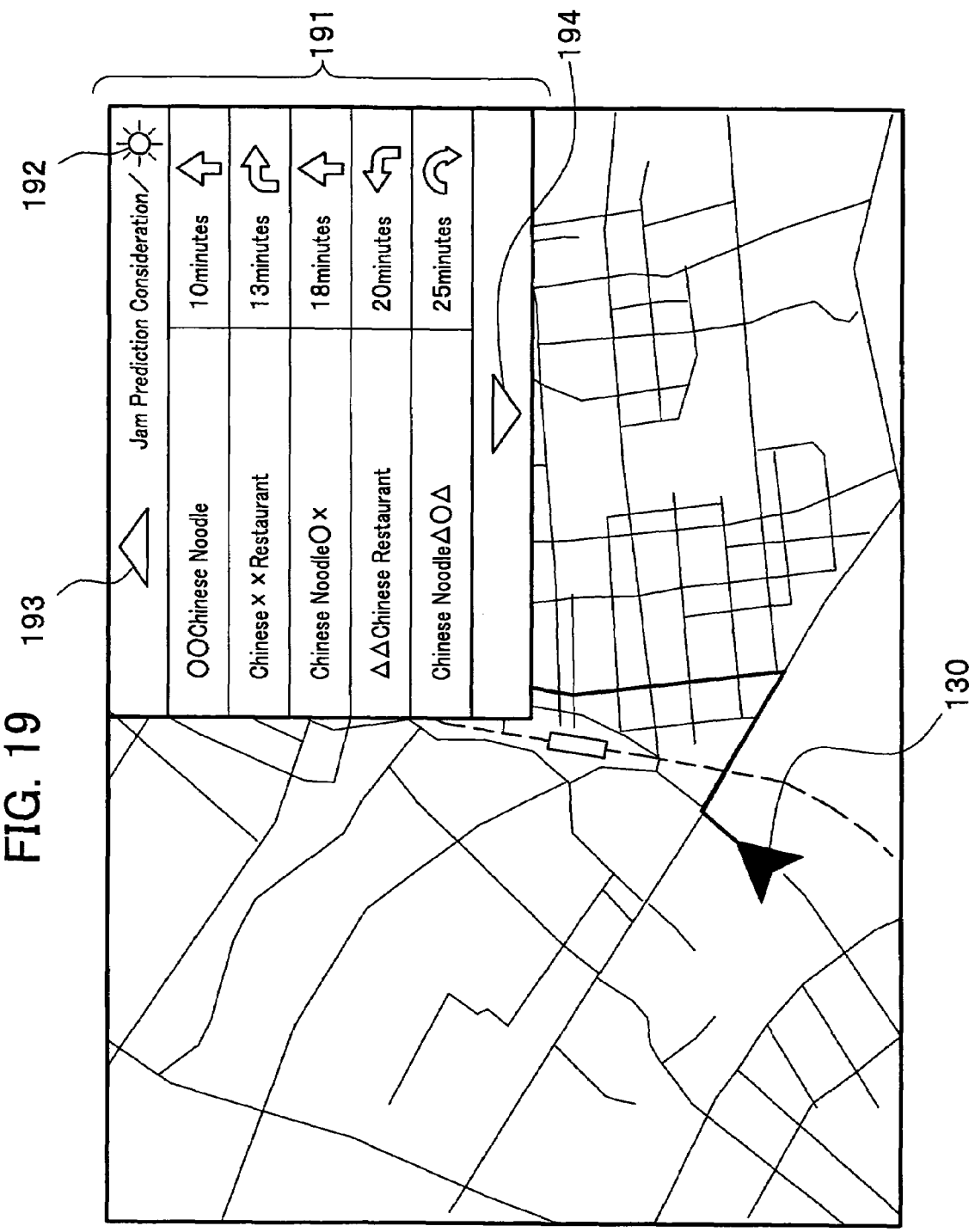
FIG. 19 is a drawing showing an example of a display screen when vicinity establishments are searched, considering a meteorological condition, in the embodiment of the present invention.

FIG. 19 is a drawing showing an example of a display screen when vicinity establishments are searched, considering a meteorological condition. In FIG. 19 a list 191 is an example of a list display when a vicinity establishment is searched by designating an establishment category as a "Chinese noodle shop" at an own vehicle location 130. In addition, it is indicated that a display of a symbol 192 is a vicinity list under a condition by which the vicinity establishment is searched, that is, the vicinity list where in the example a jam prediction and a meteorological condition are considered. At this time establishment names are sorted and displayed in ascending order of trip times to the establishments. In addition, the displayed list can be scrolled by scroll buttons 193 and 194.

FIG. 20 is a flowchart of processing of a vicinity establishment search, where a meteorological condition is considered and which is performed by a vicinity establishment search unit. In FIG. 20 the vicinity establishment search unit 609 firstly acquires traffic prediction information including meteorological forecast information from the traffic information providing apparatus 1 via the traffic prediction information acquisition unit 602 (step S41). Next, the vicinity establishment search unit 609 sets such a category of an establishment to be searched in vicinity establishments, selects one of the vicinity establishments, and set it as a destination (step S42). Then the vicinity establishment search unit 609 sets link cost, based on the traffic prediction information (step S43), and searches a route to the vicinity establishment (step S44).

Next, the vicinity establishment search unit 609 determines whether or not routes to all of the vicinity establishments are searched (step S45), and if there exists any vicinity establishment not searched (No in the step S45), the unit 609 repeats the steps S42 to S44. In addition, if the routes to all of the vicinity establishments are searched (Yes in the step S45), the vicinity establishment search unit 609 sorts the vicinity establishments in ascending order of trip times thereto (step S46), and displays the sorted vicinity establishments in a list (step S47).

Meanwhile, in the example shown in FIG. 20, although the trip times to the establishments displayed in the list are calculated according to traffic prediction information including meteorological forecast information in route search, they may also be calculated according to a route search using traffic information based on a meteorological condition input and designated with such a key button by a driver of the vehicle 10. In addition, not acquiring the traffic prediction information but using statistical traffic information stored in the statistical traffic information DB 605 instead of the former, the route search may also be performed.

Thus in accordance with the embodiment, the car-navi device 6 can search a guidance route, based on traffic information provided from the traffic information providing apparatus 1, wherein meteorological forecast information is considered. Therefore, the car-navi device 6 can calculate a highly accurate guidance route and a trip time to a destination even if meteorological information suddenly changes. Furthermore, the car-navi device 6 can perform a route search under meteorological forecast information and a meteorological condition with respect to not only the guidance route to the destination but also various route searches such as a search of a vicinity establishment, and improve a convenience for a user of the car-navi device 6.

In the embodiment thus described the traffic information providing apparatus 1 connected to the communication network 4 uses statistical data of past traffic information stored in the traffic information DB 14, actual data of present traffic information acquired from the traffic information center 2, and meteorological forecast information acquired from the meteorological information center 3; produces traffic prediction information including the meteorological forecast information; sends the produced traffic prediction information to the car-navi device 6 via the network 4; and the device 6 performs a route search, using the traffic prediction information. Consequently, as a variation example of the embodiment, without providing the traffic information providing apparatus 1, the car-navi device 6 may also be configured to perform all processing performed by the device 1.

In this case the functional blocks 12 to 17 (the communication interface unit 11 is unnecessary because of its duplication) configuring the traffic information providing apparatus 1 is configured to be included in the main body unit 61 (see FIG. 10) of the car-navi device 6. Accordingly, the car-navi device 6 directly acquires actual data of present traffic information from the traffic information center 2 and meteorological forecast information from the meteorological information center 3, and produces traffic prediction information including the meteorological forecast information within itself. Then the car-navi device 6 performs a route search, using the traffic prediction information produced by itself.

Accordingly, in the variation example of the embodiment, because the processing of the traffic prediction information request reception unit 16, the traffic prediction information providing unit 17, and the traffic prediction information acquisition unit 602 becomes information transfer processing performed within the car-navi device 6, a communication load in the communication network 4 can be widely reduced.

Furthermore, contrary to the variation example of the embodiment is available a configuration that the traffic information providing apparatus 1 includes the function of the car-navi device 6. In this case, as something corresponding to an input means of the car-navi device 6 and the display unit 62 can be appropriated a common personal computer, a PDA (Personal Digital Assistant), and a mobile connected via the communication network 4. In other words, the traffic information providing apparatus 1 can receive a request of a route search from such the common personal computer, the PDA, and the mobile, and provide them with various pieces of traffic information such as a route where meteorological forecast information is considered.

What is claimed is:

1. A car navigation system configured with a car navigation device for displaying a guidance route to a destination in a display unit and guiding a vehicle thereto and with a traffic information providing apparatus for providing the car navigation device with traffic information, wherein the car navigation device and the traffic information providing apparatus are connected via a communication network, the traffic information providing apparatus comprising:
   a communication interface where a mobile phone is connected;
   a traffic information acquisition unit configured to acquire current traffic information of the designated area from a traffic information center;
   a meteorological information acquisition unit configured to acquire meteorological forecast information of the designated area from a meteorological information center;
   a traffic information data base configured to store statistical traffic information of past traffic information regarding every link, for every time zone, for which the past traffic information is classified, and statistically processed according to at least every considered weather condition;
   a traffic information prediction unit configured to acquire the statistical traffic information for the every considered weather condition of the designated area from the traffic information data base and to produce meteorological consideration traffic forecast information of each link or a point, based on the current traffic information, the meteorological forecast information, and the statistical traffic information, by making the vehicle location and the running date and hour a starting point and predicting arrival time and meteorological information of the link or the point included in the designated area; and
   a traffic prediction information providing unit configured to send the produced meteorological consideration traffic forecast information to the car navigation device,
   wherein the apparatus is configured to be connected to the traffic information center for providing the current traffic information, the meteorological information center for providing the meteorological forecast information, and the traffic information data base for storing the past traffic information,
   the car navigation device comprising:
   the display unit configured to display a searched guidance route; and
   a main body unit comprising:
   a communication interface unit where a mobile phone is connected;
   a traffic prediction information acquisition unit configured to receive the meteorological consideration traffic forecast information sent from the traffic information providing device and the communication interface unit; and
   a guidance route search unit configured to set a link cost of a road and to search the guidance route, based on the received meteorological consideration traffic forecast information,
   wherein the meteorological consideration traffic forecast information comprises meteorological forecast information at the predicted arrival time of each link or a point other than a predicted travel time, jam length, and travel speed for the link, predicted for the every considered weather condition.

2. A traffic information providing apparatus configured to provide with traffic information a car navigation device for displaying a guidance route to a destination in a display unit and guiding a vehicle thereto, the traffic information providing apparatus comprising:
   a communication interface unit where a mobile phone is connected;
   a traffic information acquisition unit configured to acquire current traffic information of the designated area from a traffic information center;
   a meteorological information acquisition unit configured to acquire meteorological forecast information of the designated area from a meteorological information center;
   a traffic information data base configured to store statistical traffic information of past traffic information regarding every link, for every time zone, for which the east traffic information is classified, and statistically processed according to at least every considered weather condition;
   a traffic information prediction unit configured to acquire the statistical traffic information for the every considered weather condition of the designated area from the traffic information data base and to produce meteorological consideration traffic forecast information of each link or a point, based on the current traffic information, the meteorological forecast information, and the statistical traffic information, by making the vehicle location and the running date and hour a starting point and predicting arrival time and meteorological information of the link or the point included in the designated area; and
   a traffic prediction information providing unit configured to send the produced meteorological consideration traffic forecast information to the car navigation device,
   wherein the apparatus is configured to be connected to the traffic information center for providing the current traffic information, the meteorological information center for providing the meteorological forecast information, and the traffic information data base for storing the past traffic information, and
   wherein the meteorological consideration traffic forecast information comprises meteorological forecast information at the predicted arrival time of the link or the point other than a predicted travel time, jam length, and travel speed for the link predicted for the every considered weather condition.

3. A traffic information providing apparatus configured to provide with traffic information a car navigation device for displaying a guidance route to a destination in a display unit and guiding a vehicle thereto, the traffic information providing apparatus comprising:
   a communication interface unit where a mobile phone is connected;
   a traffic information data base configured to store statistical traffic information of past traffic information regarding every link, for every time zone, for which the past traffic information is classified, and statistically processed according to at least every considered weather condition;
   a traffic information prediction unit configured to acquire the statistical traffic information for the every considered weather condition of the designated area from the traffic information data base and to produce meteorological consideration traffic forecast information of each link or a point, based on the meteorological information and the traffic information, by making the vehicle location and the running date and hour a starting point and predicting arrival time of the link or the point included in the designated area; and
   a traffic information providing unit configured to send the produced meteorological consideration traffic forecast information to the car navigation device,
   wherein the apparatus is connected to the traffic information data base for storing past traffic information.

4. The car navigation system according to claim 2 configured to display the predicted arrival time or a trip time thereto and the meteorological forecast information thereat of at least one point included in the guidance route together with the guidance route,
   wherein the meteorological consideration traffic forecast information comprises the meteorological forecast information of the predicted arrival time at each link other than the traffic information of the link.

5. The car navigation system according to claim 1 further comprising a plurality-of-comparison-routes search unit configured to set a plurality of search conditions; to respectively search guidance routes for the plurality of the search conditions, based on the meteorological consideration traffic forecast information; and to display the plurality of the searched guidance routes together in the display unit.

6. The car navigation system according to claim 1 further comprising a vicinity establishment route search unit configured to instruct a search of a vicinity establishment, to search the vicinity establishment, based on the instruction and the meteorological consideration traffic forecast information, and to sort and display the searched vicinity establishment in ascending order of a distance to a present location.

7. The car navigation system according to claim 1 configured to make a meteorological condition sent to the traffic information providing apparatus a plurality of the meteorological conditions, to receive a plurality of pieces of meteorological consideration traffic forecast information produced by the traffic information providing apparatus so as to respectively correspond to the plurality of the meteorological conditions, to respectively search guidance routes for the plurality of the received search conditions, based on the plurality of pieces of the received meteorological consideration traffic forecast information, and to display the plurality of the searched guidance routes in the display unit.

8. A traffic information providing method in a traffic information providing apparatus configured to provide with traffic information a car navigation device for displaying a guidance route to a destination in a display unit and guiding a vehicle thereto, the apparatus being connected to a traffic information center for providing current traffic information, a meteorological information center for providing meteorological forecast information, and a traffic information data base storing statistical traffic information of past traffic information regarding every link, for every time zone, for which the past traffic information is classified, and statistically processed according to at least every considered weather condition, the method comprising the steps of:
   receiving information sent by the car navigation device, including a vehicle location and a running date and hour, and a designated area;
   acquiring the current traffic information of the designated area from the traffic information center;
   acquiring the meteorological forecast information for the every considered weather condition of the designated area from the meteorological information center;
   acquiring statistical traffic information of the designated area from the traffic information data base;

producing meteorological consideration traffic forecast information of each link or a point, based on the current traffic information, the meteorological forecast information, and the statistical traffic information by making the vehicle location and the running date and hour a starting point and predicting arrival time and meteorological information of the link or the point included in the designated area; and sending the produced meteorological consideration traffic forecast information to the car navigation device.

9. A traffic information providing method in a traffic information providing apparatus configured to provide with traffic information a car navigation device for displaying a guidance route to a destination in a display unit and guiding a vehicle thereto, the apparatus being connected to a traffic information data base storing statistical traffic information of past traffic information regarding every link, for every time zone, for which the past traffic information is classified, and statistically processed according to at least every considered weather condition, the method comprising the steps of:

receiving information sent by the car navigation device, including a vehicle location and a running date and hour, and a designated area;

acquiring the statistical traffic information of the designated area from the traffic information data base producing meteorological consideration traffic forecast information for the every considered weather condition of each link or a point, based on the meteorological forecast information and statistical traffic information by making the vehicle location and the running date and hour a starting point and predicting arrival time and meteorological information of the link or the point included in the designated area; and sending the produced meteorological consideration traffic forecast information to the car navigation device.

* * * * *